(12) United States Patent
Shimaguchi

(10) Patent No.: US 12,209,211 B2
(45) Date of Patent: Jan. 28, 2025

(54) UV CURABLE RESIN COMPOSITION AND UV CURABLE SHEET

(71) Applicant: SOMAR CORPORATION, Chuo-ku Tokyo (JP)

(72) Inventor: Ryusuke Shimaguchi, Chuo-ku Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 242 days.

(21) Appl. No.: 17/764,161

(22) PCT Filed: Sep. 25, 2020

(86) PCT No.: PCT/JP2020/036211
§ 371 (c)(1),
(2) Date: Mar. 25, 2022

(87) PCT Pub. No.: WO2021/060449
PCT Pub. Date: Apr. 1, 2021

(65) Prior Publication Data
US 2022/0348798 A1    Nov. 3, 2022

(30) Foreign Application Priority Data
Sep. 27, 2019  (JP) ................. 2019-177650

(51) Int. Cl.
| | | |
|---|---|---|
| *C09J 7/38* | (2018.01) | |
| *C08L 9/00* | (2006.01) | |
| *C08L 9/06* | (2006.01) | |
| *C09J 7/10* | (2018.01) | |
| *C09J 11/08* | (2006.01) | |
| *C09J 109/00* | (2006.01) | |
| *C09J 109/06* | (2006.01) | |

(52) U.S. Cl.
CPC .............. *C09J 7/383* (2018.01); *C08L 9/00* (2013.01); *C08L 9/06* (2013.01); *C09J 7/10* (2018.01); *C09J 11/08* (2013.01); *C09J 109/00* (2013.01); *C09J 109/06* (2013.01); *C09J 2301/408* (2020.08); *C09J 2301/416* (2020.08); *C09J 2409/00* (2013.01); *C09J 2493/00* (2013.01)

(58) Field of Classification Search
CPC .. C09J 7/383; C09J 2301/416; C09J 2409/00; C09J 109/00; C09J 109/06
See application file for complete search history.

(56) References Cited

U.S. PATENT DOCUMENTS

| 4,152,231 A * | 5/1979 | St. Clair ............... C08K 5/103 |
| | | 522/112 |
| 5,536,621 A | 7/1996 | Mori et al. |
| 2005/0165164 A1* | 7/2005 | Moeller ............... C09J 121/00 |
| | | 525/66 |
| 2015/0307750 A1* | 10/2015 | Nishijima ............ C09J 7/383 |
| | | 428/335 |

FOREIGN PATENT DOCUMENTS

| CN | 1721491 A | 1/2006 |
| CN | 102985446 A | 3/2013 |
| CN | 104797669 A | 7/2015 |
| JP | 62187744 A | 8/1987 |
| JP | 2010150432 A | 7/2010 |
| JP | 2010209295 A | 9/2010 |
| JP | 2019099622 A | 6/2019 |
| WO | 2014084351 A1 | 6/2014 |

OTHER PUBLICATIONS

Japanese First Office Action mailed Jan. 31, 2023 in counterpart Japanese application JP2021-549029, 7 pages in Japanese.
Japanese First Office Action mailed Jan. 31, 2023 in counterpart Japanese application JP2021-549029, 6 pages in English.
Chinese Office Action and Search Report mailed Aug. 25, 2023, in counterpart Chinese application CN202080067542.4, 12 pages in Chinese.
Chinese Office Action and Search Report mailed Aug. 25, 2023, in counterpart Chinese application CN202080067542.4, 15 pages in English.
PCT International Search Report mailed Nov. 10, 2020, in counterpart PCT Application PCTJP/2020036211,5 pages.

* cited by examiner

*Primary Examiner* — Jasper Saberi
(74) *Attorney, Agent, or Firm* — Juan Carlos A. Marquez; Marquez IP Law Office, PLLC

(57) ABSTRACT

The present invention provides a UV curable resin composition that can be cured without going through a high-temperature heating process and has excellent adhesiveness, and a sheet using the same.
The UV curable resin composition comprises a rubber component with a diene skeleton, a photopolymerization initiator, a crosslinker and a tackifier. The composition contains a solid rubber component and a liquid rubber component at 25° C. as the rubber component with the diene. Since the UV curable composition can be cured by UV irradiation in a short time, it can be applied not only to adherends with high heat resistance but also to various parts.

10 Claims, No Drawings

UV CURABLE RESIN COMPOSITION AND UV CURABLE SHEET

This application is a national stage application filed under 35 U.S.C 371 of International Application No. PCT/JP/2020/036211 filed Sep. 25, 2020, which claims priority to Japanese Application No. JP 2019177650 filed on Sep. 27, 2019. The disclosures of the above applications are incorporated herein by reference in their entireties.

TECHNICAL FIELD

The present invention relates to a UV (ultraviolet) curable composition and a UV curable sheet, particularly to a UV curable resin composition and a UV curable sheet which are used for adhesive sheets, stretchable sheets, and the like.

BACKGROUND

When a material is bonded with another material, their bonding interface often receives a stress caused by heat shrinkage, deformation vibration, and the like. The stress is gradually accumulated on the bonding interface until the bonding interface is damaged at certain time points. Especially, when different types of materials are bonded, warping, wrinkling or material damage are caused by combination of materials.

Examples of methods for alleviating these stresses can include methods for using soft components such as plasticizers in an adhesive. Softening the adhesive material layer means inducing plastic deformation. The plastic deformation of the adhesive material layer causes deformation of the materials, and the destruction between the materials and the adhesive material layer are prevented. However, once the deformed material is to be restored, a stress generated by the deformation of the adhesive material layer is accumulated in the adhesive material layer or the bonding interface as an internal stress, and then a risk that the materials are damaged caused by reduction in a cohesive force is triggered.

Patent document 1 discloses an adhesive composition, comprising (A) a rubber component with a diene skeleton, (B) a monomer and/or oligomer with 6 or more ethylenically unsaturated groups and (C) a radical initiator consisting of organic peroxide. The Patent document 1 describes an adhesive composition and an adhesive sheet using the same, the adhesive composition comprising a rubber and has an excellent adhering force, and can sufficiently prevent and reduce the warping and wrinkling.

However, since the adhesive composition in Patent document 1 uses organic peroxide being a thermal radical initiator as a radical source, the thermal curing process needs about 180° C. for heating, A heating process of about 180° C. is needed for its thermal curing, and there is room for improvement in the aspect of adherends with low thermal resistance, which is difficultly applied.

Patent document 2 discloses a manufacturing method of a cross-linked rubber, wherein a conjugated diene-based uncross-linked rubber having an unsaturated bond is cross-linked by irradiation of active light rays in the presence of a photopolymerization initiator. Then, this patent document also describes that a thin film with even thickness can be easily obtained by this manufacturing method, with good production efficiency, the obtained cross-linked rubber has more excellent heat resistance and other properties compared with uncross-linked rubbers and can be used as an adhesive and the like.

Through the method described in Patent document 2, a cured product can be obtained at a low temperature in a short time. Therefore, the cured product can be applied to adherends with low heat resistance without going through the heating process. However, the cross-linked rubber obtained by this method cannot be sufficiently bonded with the adherends.

PRIOR ART DOCUMENTS

Patent Documents

[Patent document 1] Japanese Patent Application Laid-Open No. 2017-193658
[Patent document 2] Japanese Patent Application Laid-Open No. 2010-180370

SUMMARY

The Problem to be Solved by the Present Invention

In view of this, the objective of the present invention is to provide a UV curable resin composition that can be cured without going through a high-temperature heating process and has excellent adhesiveness (adhering force), and a UV curable sheet using the same.

Means to Solve the Problem

As a result of deep research on the above subject, the inventor found out that the above problem can be solved through combined use (joint use) of a solid rubber component and a liquid rubber component at 25° C. as a rubber component in a UV curable resin composition comprising the rubber component with a diene skeleton, a photopolymerization initiator, a crosslinker, and a tackifier, and thus has completed the present invention. That is to say, the adhesive composition of the present invention is the UV curable resin composition which comprises the rubber component with the diene skeleton, the photopolymerization initiator, the crosslinker, and the tackifier. The above rubber component with the diene skeleton comprises the solid rubber component and the liquid rubber component at 25° C.

At least one of the above solid rubber components or the above liquid rubber components preferably contains at least one selected from a butadiene rubber, a styrene-butadiene rubber and an isoprene rubber.

In addition, the above solid rubber components and the above liquid rubber components preferably contain substantially no rubber component with functional group introduced thereto.

The blending amount of the above liquid rubber is preferably 3-40 mass % relative to the total amount of the rubber component.

The present invention provides a UV curable sheet, comprising an adhesive layer which is formed by the above any UV curable resin composition.

The thickness of the above adhesive layer is preferably 5-200 μm.

In addition, the 90-degree peel strength of the above UV curable sheet based on JISK-6854 after irradiation of UV with a cumulative light amount of 1600 mJ/cm$^2$ (millijoule/square centimeter) through a high-pressure mercury lamp at room temperature is preferably 7 N/inch (Newton/inch) or more.

A cured product of the above UV curable resin composition or the UV curable sheet can be properly used. The gel fraction of the above cured product is preferably 40% or more.

The Effects of the Present Invention

Since the UV curable resin composition of the present invention can be cured by UV irradiation in a short time, it can be applied not only to adherends with high heat resistance but also to various parts. The cured product obtained from the UV curable resin composition of the present invention has excellent adhesiveness while being uniform and having high mechanical strength even if it is thinned. Therefore, the obtained cured product can be suitably used not only as an adhesive sheet but also as a stretchable sheet.

Further, the UV curable resin composition of the present invention has high adhesiveness and can be easily temporary sticked before curing. Therefore, workability can be improved.

SPECIFICATION OF THE EMBODIMENTS

Next, embodiments of the present invention will be described in detail.

It is noted that in this specification, "—" representing a numerical value range represents a range of numerical value which respectively serve as an upper limit value and a lower limit value. In addition, in the case that only the upper limit value describes a unit within the numerical value range, the unit of the lower limit value is the same as that of the upper limit value.

In the numerical value range described in stages in this specification, the upper limit value or the lower limit value described in a certain numerical value range can be replaced as upper limit values or lower limit values of other numerical value ranges described in stages.

In addition, in the numerical value range described in this specification, the upper limit value or the lower limit value described in a certain numerical value range can be replaced as values as shown in examples.

When there are multiple substances belonging to each component in the composition, unless otherwise specified in this specification, the content rate or content of each component in the composition refer to the total content rate or content of multiple substances in the composition.

The UV curable resin composition of the present invention comprises a rubber component with a diene skeleton, a photopolymerization initiator, a crosslinker and a tackifier. The above rubber component with the diene skeleton comprises a solid rubber component and a liquid rubber component at 25° C.

Generally, the radical polymerized adhesive composition needs the heating process due to use of the thermal radical initiator as a radical source. The adhesive composition softened by this heating process enters the uneven parts of the surface of the adherend, and obtains excellent adhesiveness through an anchoring effect.

In contrast, since the UV curable resin composition is cured through UV irradiation using a photo-radical initiator as a radical source, a cured product can be obtained in a short time without going through the heating process. However, since the previous UV curable compositions do not undergo the heating process, the anchoring effect is difficultly formed, and sufficient adhesiveness cannot be obtained.

It was found that the adhesiveness with adherends can be improved without the heating process through combined use of the solid rubber component and the liquid rubber component at 25° C. as the rubber component with the diene skeleton, and thus the present invention was completed. Further, by using the UV curable resin composition of the present invention, an uniform sheet having high mechanical strength can be obtained even if it is thinned.

Next, the components contained in the UV curable resin composition of the present invention will be illustrated.

(A) The Rubber Component with the Diene Skeleton

The UV curable resin composition of the present invention comprises the rubber component with the diene skeleton (hereinafter also referred to as "(A) component"). Therefore, after being cured via UV irradiation, the component (A) is crosslinked and has rubber elasticity. As a result, the cured resin composition can alleviate external stress caused by thermal shrinkage and thermal shock, and sufficiently prevent and reduce warping and wrinkling.

It is noted that in the present invention, (A-1) a solid rubber component at 25° C. (hereinafter also referred to as "solid rubber component") and (A-2) a liquid rubber component at 25° C. (hereinafter also referred to as "liquid rubber component") are included as (A) a component. Next, each component will be explained.

(A-1) Solid Rubber Component

Examples of solid rubber components can include for example a butadiene rubber (BR), a styrene-butadiene rubber (SBR), an acrylonitrile-butadiene rubber (NBR), an isoprene rubber (IR), a chloroprene rubber (CR), a butyl rubber (IIR) and a natural rubber (NR), or a modified rubber such as modified BR, modified SBR, modified IR, modified NBR, modified CR, modified BR and modified NR in which functional groups are introduced. Among them, BR, SBR, IR, modified BR, modified SBR and modified IR are preferred by considering from the viewpoints of solvent solubility and the like.

Examples of functional groups of the modified rubber can include for example an amino group, an alkoxysilyl group, a hydroxyl group, an epoxy group, a carboxyl group, an acid anhydride group and the like. The introduction positions of the functional groups are not specially limited, namely, monomers having functional groups are directly co-polymerized to be introduced into a polymer chain, or modified with a modifier to be introduced into the terminal end of the polymer, or introduced into the side chain of the polymer.

It is noted that both a block copolymer and a random copolymer can be used as SBR or modified SBR. The lower limits of styrene contents of SBR and modified SBR are preferably 15 mass %, more preferably 18 mass %. The upper limits of styrene contents of SBR and modified SBR are preferably 60 mass %, more preferably 50 mass %. The lower limits of the vinyl contents of SBR and modified SBR are preferably 10 mass %. The upper limits of the vinyl contents of SBR and modified SBR are preferably 50 mass %. It is noted that the vinyl content refers to a content rate of 1,2-coalition in a butadiene monomer unit of a polymer chain. One solid rubber component can be used alone, or two or more solid rubber components can be used in combination.

The solid rubber component is not specially limited as long as it is a solid at 25° C. The Mooney viscosity is preferably 10-90, more preferably 20-60. By setting the Mooney viscosity 10 or more, the mechanical strength can be improved, and the effects of inhibiting bleeding and dripping during forming the sheets can be expected. On the other hand, by setting the Mooney viscosity 90 or less, the solubility to the solvent can be satisfied.

It is noted that, in this specification, the Mooney viscosity refers to a Mooney viscosity (Mooney viscosity ML1+4 (100° C.)) measured at 100° C., which is measured based on JIS K-6300-1:2013.

The Mooney viscosity is an index of industrial viscosity measured by a Mooney viscometer serving as a rotational plasticity meter. In ML1+4 (100° C.), M represents the Mooney viscosity, L represents a large rotor (L type), 1+4 refers to a value measured under the conditions that the preheating time is 1 min, the rotation time of the rotor is 4 min, and the temperature is 100° C. The Mooney viscosity can be controlled within the above-mentioned range by adjusting molecular weight, molecular weight distribution, styrene content and microstructures of the solid rubber component.

Preparation methods of modified rubbers are not specially limited. The modified rubber can be prepared by for example the following methods. Included are methods for introducing the above functional groups by respectively modifying BR, SBR, IR, NBR, CR and IIR synthesized by anionic polymerization or NR serving as a natural product, with a modifier, or methods for introducing the above functional groups onto the polymer chain by co-polymerizing monomers having the above functional groups with monomers constituting basic polymers.

(A-2) Liquid Rubber Component

The UV curable resin composition of the present invention is characterized by comprising the liquid rubber component in addition to the solid rubber component.

By the addition of the liquid rubber component, the fluidity is improved, and it penetrates into the recesses on the surface of the adherend, as to easily adhere to the uneven shape of the adherend. Therefore, the adhesiveness of the cured product can be improved without the heating process. Further, more even sheet with high mechanical strength can also be obtained even if the film is thinned.

Here, a liquid means having fluidity at normal temperature and normal pressure (1 atm, 25° C.). Specifically, it means that when being inclined at 45°, the rubber component added into a container is deformed due to its shape being not maintained for 5 min or more.

Examples of the liquid rubber component can include BR, SBR, IR, NBR, CR, IIR, NR and the like. In addition, modified rubbers in which functional groups are introduced, such as modified BR, modified SBR, modified IR, modified NBR, modified CR, modified IIR and modified NR can be used. Through introduction of functional groups, the polarity of the liquid components is improved, and it can be expected to improve the adherence characteristics with the adherend.

Examples of functional groups can include for example an amino group, an alkoxysilyl group, a hydroxyl group, an epoxy group, a carboxyl group and an acid anhydride group.

It is noted that in the introduction positions of the functional group are not specially limited, namely, the functional groups can be introduced by co-polymerizing the monomers having functional groups, introduced into the terminal end of the polymer by modifying with a modifier, or introduced into the side chain of the polymer. In addition, both a block copolymer and a random copolymer can be used as SBR or modified SBR. One liquid rubber component can be used alone, or two or more liquid rubber components can be used in combination.

The preparation methods of modified BR, modified SBR, modified IR, modified NBR, modified CR, modified IIR and modified NR are not specially limited, and the above modified rubbers can be prepared by using methods that are the same as preparation methods described in (A-1) solid rubber component.

The molecular weight of the liquid rubber component is not specially limited as long as the liquid rubber component has fluidity at 25° C., and a number average molecular weight is preferably 80,000 or less, more preferably 1,000-50,000, and further preferably 2,000-40,000.

Relative to the totality of the rubber component, that is, the total amount of the solid rubber component and the liquid rubber component, the lower limit of the content of the liquid rubber component is preferably 3 mass %, further preferably 8 mass %. On the other hand, relative to the totality of the rubber component, that is, the total amount of the solid rubber component and the liquid rubber component, the upper limit of the content of the liquid rubber component is preferably 40 mass %, further preferably 35 mass %.

By setting the content of the liquid rubber component as 3 mass % or more relative to the totality of the rubber component, that is, the total amount of the solid rubber component and the liquid rubber component, the fluidity of the resin is improved, and it can be expected that an effect that the adhesive with a substrate is improved.

On the other hand, by setting the content of the liquid rubber component as 40 mass % or less relative to the totality of the rubber component, that is, the total amount of the solid rubber component and the liquid rubber component, an effect of maintaining high mechanical strength can be expected.

It is noted that, by appropriately combining the known methods, it can be confirmed that the UV curable composition comprises the liquid rubber component. For example, after the U curable composition is extracted with a solvent, its extract can be evaluated by means of gel permeation chromatography (GPC), infrared spectroscopy (IR), nuclear magnetic resonance (NMR) or the like.

(B) Photopolymerization Initiator

Since the UV curable resin composition of the present invention comprises a photopolymerization initiator, it can be cured by UV irradiation in a short time. Therefore, the UV curable resin composition of the present invention does not need to be heated at a high temperature of about 180° C. like the adhesive composition containing organic peroxide as a thermal radical initiator, so it can be applied to more adherend materials.

Examples of photopolymerization initiators used in the UV curable resin composition of the present invention can include an alkylphenone type polymerization initiator, an acylphosphine oxide type photopolymerization initiator, a titanocene type compound, an oxime ester type compound, a benzoin type compound, an acetophenone type compound, a benzophenone type compound, a thioxanthone type compound, an α-acyl oxime ester type compound, a phenyl glyoxylic acid type compound, a benzyl type compound, an azo type compound, a diphenyl sulfide type compound, an organic pigment type compound, an iron phthalocyanine type compound, a benzoin ether type compound and an anthraquinone type compound.

One photopolymerization initiator can be used along, or two or more photopolymerization initiators can be used in combination.

Among them, starting from the viewpoint of reactivity, the alkylphenone type compound and the acylphosphine oxide type compound are preferred.

Examples of the alkylphenone type polymerization initiators can include α-amino alkylphenone type or benzyl methyl ketal type polymerization initiators, and specifically can include 2-methyl-1[4-(methylthio)phenyl]-2-morpholinopropane-1-one, 2-benzyl-2-dimethylaminol-(4-morpholinophenyl)butanone-1,2-methyl-1-[4-(methoxythio)-phenyl]-2-morpholinopropane-2-one, 2,2-dimethoxy-1,2-diphenylethane-1-one and 1-hydroxycyclohexyl phenyl ketone. They can be used alone or in combination.

Examples of the acylphosphine oxide type photopolymerization initiators include for example 2,4,6-trimethylbenzoyl-diphenylphosphine oxide, bis(2,4,6-trimethylbenzoyl)-phenyl phosphine oxide. They can be used alone or in combination.

Relative to the totality of the rubber component, that is, the total amount of the solid rubber component and the liquid rubber component, the content of the photopolymerization initiator is preferably 0.01 mass %-10 mass %, further preferably 0.1 mass %-5 mass %, more further preferably 0.5 mass %-3 mass %.

By setting the content of the photopolymerization initiator as 0.01 mass % or more relative to the totality of the rubber component, that is, the total amount of the solid rubber component and the liquid rubber component, the above rubber components are crosslinked with a low cumulative light amount.

On the other hand, by setting the content of the photopolymerization initiator as 10 mass % or less relative to the totality of the rubber component, that is, the total amount of the solid rubber component and the liquid rubber component, the above rubber components are uniformly crosslinked in a film thickness direction.

By setting the content of the photopolymerization initiator as the above range, the UV curable resin composition is more efficiently cured, and the adhesiveness and the mechanical strength of the obtained cured product are further improved.

(C) Crosslinker

Since the UV curable resin composition of the present invention comprises (C) a crosslinker, the cohesive force of the cured product is improved, and the mechanical strength and adhesiveness of the cured sheet are improved.

The crosslinker can adopt for example a multi-functional (meth)acrylate having 2 or more, more preferably 3 or more and further preferably 6 or more ethylenically unsaturated groups. Specifically, examples of crosslinkers can include known polyester (meth)acrylate, polyether (meth)acrylate, epoxy (meth)acrylate, urethane (meth)acrylate and silicone (meth)acrylate, which have 2 or more ethylenically unsaturated groups. The multi-functional (meth)acrylate having 2 or more ethylenically unsaturated groups can be used alone, or 2 or more these multi-functional (methyl) acrylates having 2 or more ethylenically unsaturated groups can be used in combination. It is noted that (meth)acrylate refers to acrylate or methacrylate.

In the background art where the thermal radical initiator is used, the heating process of about 180° C. is needed. Therefore, when a crosslinker having 5 or less ethylenically unsaturated groups is used, the UV curable sheet satisfying the mechanical strength and adhesiveness cannot be obtained because the crosslinker is volatilized during the heating. In contrast, since a heat curing process is not needed in the present invention where UV curing is used, the crosslinker having 5 or less ethylenically unsaturated groups is not volatilized, and the UV curable sheet having excellent mechanical strength and adhesiveness can be obtained.

It is noted that the number of the ethylenically unsaturated groups of the crosslinker are preferably 15 or less, more preferably 10 or less. If the number of the ethylenically unsaturated groups is 15 or less, the functional groups sufficiently react when ultraviolet irradiation is conducted, so as to inhibit time-dependent reaction during the use, and therefore a UV-curable sheet having more excellent weather resistance can be obtained.

Relative to the totality of the rubber component, that is, the total amount of the solid rubber component and the liquid rubber component, the content of the crosslinker is preferably 0.1 mass %-100 mass %, more preferably 1 mass %-30 mass %. By setting the content of the crosslinker within the above-mentioned range, a UV curable resin composition and a UV curable sheet which have more excellent adhesiveness can be obtained.

(D) Tackifier

The UV curable resin composition of the present invention comprises (D) a tackifier. Therefore, the wettability to the adherend can be enhanced, and the adhering force after curing can be further improved. And, even when the component (A) does not substantially contain a substance having a functional group introduced therein, the adhesive strength after curing can be satisfied. Moreover, tackiness can also be given to the UV curable resin composition by comprising the tackifier.

The tackifier can adopt a styrene resin, an xylene resin, a terpene resin, a phenolic resin, rosin, polymerized rosin, non-homogenized rosin and its derivatives, a polyterpene resin, phenol modified resins such as terpene phenol or rosin phenol modified resins, an alkyl phenolic resin, a coumarone-indene resin, an xylene resin, an aliphatic hydrocarbon resin, an alicyclic hydrocarbon resin, an aromatic hydrocarbon resin and their hydrogenated products, etc.

One tackifier can be used alone, or two or more tackifiers can be used in combination.

Relative to the totality of the rubber component, that is, the total amount of the solid rubber component and the liquid rubber component, the content of the tackifier is preferably 5 mass %-100 mass %, more preferably 10 mass %-50 mass %. By setting the content of the tackifier within the above range, the workability of the UV curable resin composition when not being cured and the adhesiveness of the UV curable resin composition after being cured can be further improved.

In the present invention, the effect obtained by adding the tackifier is remarkable in the case of using only the rubber components not introduced with the functional groups, compared to the case of using the rubber components introduced with the functional groups. It was confirmed that sufficient adhesive strength can be achieved in the case of using only the rubber components not introduced with the functional groups. That is, in the present invention, excellent adhesive strength can be achieved even if the composition does not substantially contain the rubber components introduced with the functional groups.

In the UV curable resin composition of the present invention, film-forming aids, various fillers, functional fillers, antioxidants, light stabilizers, colorants, flame retardants, antifoaming agents, leveling agents, lubricants, dispersants, processing aids, plasticizers, coupling agents and other previously known additives can also be further properly used.

Next, the UV curable sheet of the present invention will be described.

The UV curable sheet of the present invention has an adhesive layer formed by the above-mentioned UV curable resin composition. For the UV curable sheet of the present invention, the above-mentioned UV curable resin composition can be coated on the surface of the release film to form the adhesive layer, and then the adhesive layer can be peeled from the release film to only obtain the adhesive layer. In addition, the above-mentioned UV curable resin composition can be coated on the at least one surface of the substrate so that multiple adhesive layers are stacked. Hereinafter, the release film, the substrate, and the adhesive layer will be demonstrated.

The release film can adopt a polyethylene film, a polypropylene film, a polymethylpentene (TPX) film, a polyethylene film with a silicone release agent, a polypropylene film with a silicone release agent and a polyethylene terephthalate (PET) film with a silicone release agent, polyethylene resin coated paper, polypropylene resin coated paper and TRX resin coated paper, or the like. The thickness of the release film can be properly selected as needed. The thickness of the substrate of the film is preferably 12-250 µm, and the thickness of the substrate of paper is preferably 50-300 µm.

The substrate is not specially limited and can be properly selected according to the uses of the UV curable sheet. In particular, the substrate can adopt films containing synthesized resins such as polyethylene terephthalate, polyethylene naphthalate, polyethylene, polypropylene, polycarbonate, acrylic resin, triacetyl cellulose, cyclic olefin polymers, cyclic olefin copolymers, aramid, polyimide, polyamide, polyphenylene sulfide, polyetherimide, polyethersulfone, aromatic polyamide and polysulfone, nonwoven fabric, paper and the like. The thickness of the substrate is not specially limited, and can be properly selected according to uses.

The thickness of the adhesive layer can be properly set according to the uses of the UV curable sheet. The lower limit is preferably 5 µm, further preferably 10 µm. The upper limit is preferably 200 µm, more preferably 150 µm. By setting the thickness of the adhesive layer within the above range, the excellent adhesive property can be maintained based on the unevenness of the surface of the adherend, or the adhesive layer can be properly used for a use required for thinning.

By using the UV curable resin composition of the present invention, a sheet having a thin and uniform structure can be well produced compared to thermal curing. Due to high mechanical strength, high flexibility, the obtained thin UV curable sheet can be properly used as an adhesive sheet, a stretchable sheet and the like.

The reasons why the cured product having excellent mechanical strength can be obtained even though it is thin are as follows. In the case of thermal curing type, if the thickness of the sheet is thinned, an influence generated by heat convection between the solid rubber component and the liquid rubber component is remarkable. As a result, for example, the liquid rubber component is aggregated and crystallized, ununiform parts are locally generated, and fractures easily occur from the parts. On the other hand, in the case of UV curing type, it is considered that heat convection between the solid rubber component and the liquid rubber component in the sheet is less likely to occur due to little heat generated when in UV irradiation, and local ununiform parts are difficult to form. Therefore, the sheet with high tensile strength can be obtained even though it is thin.

Next, the preparation method of the UV curable sheet of the present invention will be described.

The UV curable resin composition of the present invention is dissolved or dispersed into a solvent to prepare a coating liquid for forming the adhesive layer (hereinafter referred to as the coating liquid). The concentration of the solid component of the coating liquid is preferably set as 10 mass %-90 mass %, more preferably 20 mass %-60 mass %. When the release film is used, the coating liquid is coated on the surface of the release film and then dried to form a film or a sheet, and peeling is conducted from the release film to obtain the UV curable sheet only containing the adhesive layer. Moreover, when the substrate is used, the coating liquid is coated on the single side or two sides of the substrate and then dried to obtain the UV curable sheet.

The coating method of the coating liquid is not specially limited, and can adopt a wire bar, an applicator, a brush, a sprayer, a roller, a gravure coater, a die coater, a lip coater, a comma coater, a knife coater, a reverse coater, a spin coater and other known methods. It is noted that the surface of the release film coated with the coating liquid or the surface of the substrate can also be subjected to surface treatment in advance as needed.

The drying method of the coating liquid is not specially limited, and can adopt conventional methods such as hot air drying and reduced pressure drying can be used. Drying conditions can be appropriately set according to the types of the UV curable compositions, the types of solvents used in preparation of the coating liquid, the film thickness of the adhesive layer and the like. Usually, drying is performed for 1 min-10 min at 60° C.-130° C.

As long as UV irradiation is conducted, the UV curable sheet of the present invention can be used as a general adhesive sheet. Specifically, the UV curable sheet can be used as adhesive sheet for adhesion between materials with different linear expansion coefficients (CTE), adhesive sheets with reworkability, anisotropic conductive adhesive sheets, exothermic adhesive sheets, stretchable adhesive sheets capable of following the expansion and contraction of materials, alternative to silicone-based or urethane-based adhesive sheets and adhesive sheets with vibration durability.

The obtained UV curable sheet is irradiated by UV, so that the rubber components having the diene skeletons are cross-linked to obtain the cured product. UV irradiation can be performed by a high pressure mercury lamp, a molten (Fusion) H lamp, a xenon lamp, a metal halide lamp, a UV-LED lamp and the like. Preferably, the cumulative light amount is about 300-3,000 mJ/cm$^2$.

For the UV curable sheet in which the adhesive layer is provided on the surface of the substrate, an adhesive layer side or a substrate side can be irradiated by UV. However, when the substrate side is irradiated, the substrate must be UV-permeable.

(Gel Fraction of Cured Product)

The lower limit of the gel fraction of the obtained cured product is preferably 40%. If the gel fraction is 40% or more, high mechanical strength can be obtained. The upper limit of the gel fraction of the obtained cured product is preferably 95%. If the gel fraction is 95% or less, the higher stretchability can be obtained. It is noted that the gel fraction can exceed 90%, further 95%, however, at this case, the cured product becomes too hard, and possibly cannot be applied to some uses. The gel fraction is measured according to the following method.

The UV curable sheet only containing the adhesive layer having a predetermined thickness is cured by irradiation of UV with a cumulative light amount of 1,600 mJ/cm$^2$ at room temperature through a high-pressure mercury lamp, and then a test sheet with a size of 30 mm×30 mm is fabricated. The test sheet is embedded into a polyester mesh [mass (A gram)] to measure mass (B g). Subsequently, the test sheet is immersed in 100 mL of toluene and placed for 96 h or more at room temperature. After that, the test sheet with the mesh is taken out, washed with toluene and dried for 3 h at 120° C. The mass (C g) after drying is measured, and the gel fraction is calculated by the following formula.

Gel fraction (mass %)=[(C−A)/(B−A)]×100

(Peel Strength of UV Curable Sheet)

The 90-degree peel strength of the UV curable sheet of the present invention is preferably 7 N/inch or more, and further preferably 10 N/inch or more. The 90-degree peel strength of the UV curable sheet is measured according to the following method.

A PET substrate with a thickness of 50 μm and a stainless steel (SUS304, thickness 1.5 mm) subjected to bright surface annealing are used as adherends. The UV curable sheet only containing the adhesive layer with a predetermined thickness is sandwiched between the above-mentioned adherends, and then bonded by a hand roller (manual roll), and irradiated by UV with a cumulative light amount of 1600 mJ UV/cm² from the PET substrate side by using a high-pressure mercury lamp at room temperature to be cured as a test sheet. The 90-degree peel strength of the test sheet on stainless steel is measured at a tensile speed of 50 mm/min (mm/min) in accordance with JIS K-6854. A universal testing machine #5982 manufactured by Instron Corporation is used for measurement.

(Mechanical Strength of UV Curable Sheet)

In the present invention, the mechanical strength is evaluated by the following method.

After the UV curable sheet only containing the adhesive layer with the predetermined thickness is irradiated by UV with a cumulative light amount of 1600 mJ UV/cm² at room temperature to be cured, the tensile strength (MPa) at cutting and elongation (%) at break are measured according to JIS. K-6251, except that the size of the test sheet is changed into 10 mm×150 mm. It is noted that the tensile speed is set as 500 mm/min.

The tensile strength at cutting of the UV curable sheet of the present invention after being cured is preferably 2 Mpa or more, further preferably 3 MPa or more.

The elongation at break of the UV curable sheet of the present invention after being cured is preferably 200% or more, further preferably 300% or more.

Examples

The present invention will be further described in detail by the following examples, but is not limited thereto. It is noted that in examples, without special description, "%" and "part" represent mass % and mass part.

(Components of UV Curable Resin Composition)
(A) A rubber component with a diene skeleton
(A-1) Solid rubber component
(A-1-1) Styrene-butadiene rubber: (styrene content: 25%, Mooney viscosity ML1+4 (100° C.): 47)
(A-1-2) Styrene-butadiene rubber: (styrene content: 46%, Mooney viscosity ML1+4 (100° C.): 45)
(A-1-3) Butadiene rubber: (Mooney viscosity ML1+4 (100° C.): 45)
(A-2) Liquid rubber component
(A-2-1) Butadiene homopolymer: (Mn: 4.5×1000, 1,2 vinyl: 28%,)
(A-2-2) Butadiene homopolymer: (Mn: 8.0×1000, 1,2 vinyl: 28%,)
(A-2-3) Butadiene homopolymer: (Mn: 4.7×1000, 1,2 vinyl: 85%,)
(A-2-4) Butadiene•styrene random copolymer: (1,2 vinyl (butadiene): 70%, styrene content: 25%, Mn: 4.5×1000)
(A-2-5) Maleic anhydride modified styrene-butadiene rubber: (Mn: 9.1×1000, acid value: 34 mgKOH/g)
(B) Photopolymerization initiator
(B-1) 1-hydroxycyclohexyl phenyl ketone
(B-2) 2,2-dimethoxy-1,2-diphenylethan-1-one
(B') Radical initiator consisting of an organic peroxide
(B'-1) Dicumyl peroxide
(C) Crosslinker
(C-1) Dipentaerythritol hexaacrylate serving as one of polyester acrylates, with 6 ethylenically unsaturated groups
(C-2) Aromatic polyester acrylate, with 2 ethylenically unsaturated groups
(C-3) Pentaerythritol tetraacrylate, with 4 ethylenically unsaturated groups
(C-4) Urethane acrylate with 10 ethylenically unsaturated groups
(D) Tackifier
(D-1) Aromatic modified terpene resin: YS Resin TO115 (prepared by Yasuhara Chemical Co., Ltd.)
(D2) Ethylene vinyl acetate copolymer: EVAFLEX (registered trademark) EV-45LX (prepared by Dow-Mitsui Polychemicals Co., Ltd.)
(D3) Modified rosin ester resin: NEOTOL (registered trademark) NT-15 (prepared by Harima Chemicals Group, Inc)
(D4) Rosin p henolic resin: NEOTOL (registered trademark) 125P (prepared by Harima Chemicals Group, Inc)
(D-5) Alkylphenol modified xylene resin: NIKANOL GHP-150 (prepared by fudow Corporation)
(D6) Styrene resin: YS resin SX-100 (prepared by Yasuhara Chemical Co., Ltd)

Examples 1-12, Comparative Examples 1-6, and Reference Examples 1

Various components in mass ratios seen in Tables 1-3 were added into toluene to be mixed and stirred, and then defoameded under reduced pressure to obtain a coating liquid. The obtained coating liquid was coated on a release film (a PET film with a silicone release agent) using an applicator (coater). Here, the thickness of the dried adhesive layer was adjusted to the thickness described in Tables 1-3. After drying for 3 min at 120° C., the release film was peeled off to obtain the UV curable sheet.

Then, the UV curable sheets in examples 1-12 and comparative examples 1-6 were irradiated by UV with a cumulative light amount of 1600 mJ/cm² at room temperature through a high pressure mercury lamp to obtain the cured products. Table 1, Table 2, and Table 3 show measurement results of gel fractions, 90-degree peel strengths, tensile strengths at cutting and elongations at break of the obtained cured products by the above-mentioned methods.

It is noted that, as a reference, a composition in reference example 1 using an organic peroxide serving as a thermal radical initiator as a radical source was also prepared. In reference examples, the cured product was obtained by heating for 1 h at 180° C.

As shown in Table 1, in comparative example 1 where only the solid rubber component is included as a rubber component with a diene skeleton, the gel fraction of the obtained cured product was 72.8%, however the 90-degree peel strength was lower, being 1.1 N/inch. In comparative example 2 where an aromatic modified terpene resin was added to the composition of comparative example 1 as a tackifier, the 90-degree peel strength increased to 3.9 N/inch. However, the value is not enough.

On the other hand, in comparative example 3 where only the liquid rubber component was included as the rubber component with the diene skeleton, the gel fraction of the obtained cured product was 5%, and the obtained cured product cannot be made into the sheet. In comparative example 4 where an aromatic modified terpene resin was added to the composition of comparative example 3 as a tackifier, the gel fraction of the obtained cured product decreased to 3.0%, and the obtained cured product could not be made into the sheet as same as comparative example 3.

a rubber component with a diene skeleton, and further containing the tackifier was confirmed.

The reference example 1 is an example in which the thermal radical initiators consisting of organic peroxides was added instead of the photopolymerization initiator in the composition of the comparative example 1. Since both the comparative example 1 and the reference example 1 showed the same level of the gel fraction, it was confirmed that the curing reaction was progressing by the irradiation with ultraviolet rays.

It was confirmed that the cured product of example 1 has sufficient tensile strength at cutting and elongation at break compared with the cured product of the reference example 1 prepared by thermal curing. It is noted that reference

TABLE 1

| | | | Example 1 | Comparative example 1 | Comparative example 2 | Comparative example 3 | Comparative example 4 | Comparative example 5 | Reference example 1 |
|---|---|---|---|---|---|---|---|---|---|
| UV curable composition | (A-1) Solid rubber component | (A-1-1) Styrene-butadiene rubber | 90 | 100 | 100 | — | — | 90 | 100 |
| | (A-2) Liquid rubber component | (A-2-1) Butadiene homopolymer | 10 | — | — | 100 | 100 | 10 | — |
| | (B) Photopolymerization initiator | (B-1)1-hydroxy-cyclohexyl phenyl ketone | 1 | 1 | 1 | 1 | 1 | 1 | — |
| | (B') Radical initiators consisting of organic peroxides | (B'-l) Dicumyl peroxide | — | — | — | — | — | — | 0.05 |
| | (C) Crosslinker | (C-1) Dipentaerythritol polyacrylate | 5 | 5 | 5 | 5 | 5 | 5 | 5 |
| | (D)Tackifier | (D1) Aromatic modified terpene resin | 30 | — | 30 | — | 30 | — | — |
| Measurement evaluation results | Thickness of adhesive layer (μm) | | 100 | 100 | 100 | 100 | 100 | 100 | 100 |
| | Gel fraction (%) | | 51.4 | 72.8 | 55.6 | 5.0 | 3.9 | 64.2 | 74.4 |
| | 90-degree peel strength (N/inch substrate: PET (50 μm) | | 10.3 | 1.1 | 3.9 | — | — | 3.3 | — |
| | Mechanical strength | Tensile strength at cutting (MPa) | 3.0 | 4.6 | 5.3 | — | — | 3.4 | 6.0 |
| | | Elongation at break (%) | 910 | 700 | 900 | — | — | 620 | 440 |

In addition, in comparative example 5 containing a solid styrene-butadiene rubber and a liquid butadiene homopolymer as the rubber component with the diene skeleton, the 90-degree peel strength was 3.3 N/inch. Although this value is higher than that of comparative example 1 containing only a solid styrene-butadiene rubber, it can not be said to be sufficient.

In contrast, in example 1 where the aromatic modified terpene resin was added to the composition of comparative example 5 as the tackifier, the 90-degree peel strength greatly increased to 10.3 N/inch. Thus, the effect of the UV curable composition of the present invention containing the solid rubber component, and the liquid rubber component as example 1 requires heating at 180° C., thus, the 90-degree peel strength could not be measured due to PET serving as the adherend.

On the other hand, in example 1, although PET was used as the adherend however, the heating process was not required, so the 90-degree peel strength could be measured. Then, from the obtained value, it was also confirmed that the example 1 has the adhering force usually required as an adhesive sheet. Therefore, it was found out that the UV curable resin composition, which can be cured without going through a high-temperature heating process, has excellent adhesiveness (adhering force) and can be used by the adherend with poor heat resistance, can be obtained in the present invention.

Table 2 shows the following results: (A-2-2) butadiene homopolymer: (Mn: 8.0×1000, 1,2 vinyl: 28%,) (example 2), (A-2-3) butadiene homopolymer: (Mn: 4.7×1000, 1,2 vinyl: 85%,) (example 3), (A-2-4) butadiene•styrene random copolymer: (example 4), and (A-2-5) maleic anhydride modified styrene-butadiene rubber (example 5) which are used as liquid rubber component instead of (A-2-1) butadiene homopolymer: (Mn: 4.5×1000, 1,2 vinyl: 28%).

In the example 2 where (A-2-2) butadiene homopolymer was used, the 90-degree peel strength was 13.7 N/inch. The 90-degree peel strength of the comparative example 6 not containing the tackifier was 3.0 N/inch. Thus, it was confirmed that the peel strength can be significantly increased by the addition of the tackifier, same as the example 1.

Further, it was confirmed that in all examples 3, 4 and 5, the 90-degree peel strength exceeded 10 N/inch, and the elongation at break also showed sufficient values. Therefore, regardless to the type of the liquid rubber component, with the configuration of the present invention in which the solid rubber component and the liquid rubber component as the rubber component with a diene skeleton, and further containing the tackifier are contained, it was found that a UV curable resin composition and a UV curable sheet having excellent adhesiveness in spite of rubber can be realized.

method as example 1. When the addition amount of the tackifier was increased, the 90-degree peel strength increased, however, the mechanical strength tended to decrease.

Considering the 90-degree peel strength, the content of the tackifier with respect to the total amount of the rubber component, that is, the total amount of the solid rubber component and the liquid rubber component, is preferably 5 mass % or more, more preferably 10 mass % or more. On the other hand, considering the mechanical strength, the content of the tackifier with respect to the total amount of the rubber component is preferably 100 mass % or less, more preferably 50 mass % or less.

The photopolymerization initiator of example 2 was changed from (B-1) 1-hydroxycyclohexyl phenyl ketone to (B-2) 2,2-dimethoxy-1,2-diphenylethan-1-one, and the UV curable resin composition and the UV curable sheet were prepared and evaluated by the same method as example 1 The result is shown in Table 3 (Example 6). From the result, it was confirmed that the effect of the present invention can be obtained showing the excellent adhesive strength and mechanical strength even when 2,2-dimethoxy-1,2-diphenylethan-1-one was used as the photopolymerization initiator.

TABLE 2

| | | | Example 1 | Comparative example 5 | Example 2 | Comparative example 6 | Example 3 | Example 4 | Example 5 |
|---|---|---|---|---|---|---|---|---|---|
| UV curable composition | (A-1) Solid rubber component | (A-1-1) Styrene-butadiene rubber | 90 | 90 | 90 | 90 | 90 | 90 | 90 |
| | (A-2) Liquid rubber component | (A-2-1) Butadiene homopolymer | 10 | 10 | — | — | — | — | — |
| | | (A-2-2) Butadiene homopolymer | — | — | 10 | 10 | — | — | — |
| | | (A-2-3) Butadiene homopolymer | — | — | — | — | 10 | — | — |
| | | (A-2-4) Butadiene-styrene random copolymer | — | — | — | — | — | 10 | — |
| | | (A-2-5) Maleic anhydride modified styrene-butadiene rubber | — | — | — | — | — | — | 10 |
| | (B) Photopolymerization initiator | (B-1) 1-hydroxycyclohexyl phenyl ketone | 1 | 1 | 1 | 1 | 1 | 1 | 1 |
| | (C) Crosslinker | (C-1) Dipentaerythritol polyacrylate | 5 | 5 | 5 | 5 | 5 | 5 | 5 |
| | (D) Tackifier | (D-1) Aromatic modified terpene resin | 30 | — | 30 | — | 30 | 30 | 30 |
| Measurement evaluation results | Thickness of adhesive layer (μm) | | 100 | 100 | 100 | 100 | 100 | 100 | 100 |
| | Gel fraction (%) | | 51.4 | 64.2 | 53.7 | 65.6 | 54.7 | 54.2 | 59.3 |
| | 90-degree peel strength (N/inch substrate: PET (50 μm)) | | 10.3 | 3.3 | 13.7 | 3.0 | 10.6 | 10.8 | 13.4 |
| | Mechanical strength | Tensile strength at cutting (MPa) | 3.0 | 3.4 | 3.4 | 3.5 | 3.9 | 3.8 | 3.2 |
| | | Elongation at break (%) | 910 | 620 | >1000 | 520 | 980 | >1000 | 790 |

Except that (A-1-2) styrene-butadiene rubber or (A-1-3) butadiene rubber was used as the solid rubber component instead of (A-1-1) styrene-butadiene rubber in example 1, the UV curable sheet and the cured product were prepared like example 1. Although not shown in the table, from the evaluation results of the above UV curable sheet and the cured product, it was confirmed that the effect of the present invention can be obtained even when solid rubber component was used.

Except that ethylene vinyl acetate copolymer, modified rosin ester resin, rosin phenolic resin, alkylphenol modified xylene resin, or styrene resin was used as the tackifier instead of aromatic modified terpene resin in example 1, the UV curable sheet and the cured product were prepared like example 1. Although not shown in the table, from the evaluation results of the above UV curable sheet and the cured product, it was confirmed that the effect of the present invention can be obtained showing the excellent adhesive strength even when the above tackifier was used.

Except that the addition amount of the tackifier is changed, the UV curable resin composition and the UV curable sheet were prepared and evaluated by the same (C-2) aromatic polyester acrylate, with 2 ethylenically unsaturated groups (Example 7), (C-3) pentaerythritol tetraacrylate, with 4 ethylenically unsaturated groups (Example 8), or (C-4) urethane acrylate with 10 ethylenically unsaturated groups was used as the crosslinker instead of (C-1) Dipentaerythritol hexaacrylate with 6 ethylenically unsaturated groups, the UV curable composition and the UV curable sheet were prepared and evaluated like example 6. The results were also shown in Table 3. From the above results, it was confirmed that the adhesiveness was improved and excellent mechanical strength was obtained when any (meth)acrylate having 2 to 10 ethylenically unsaturated groups was used as the crosslinker. In addition, the liquid rubber component was changed to butadiene•styrene random copolymer, and (C-2) aromatic polyester acrylate (Example 10), (C-3) Pentaerythritol tetraacrylate (Example 11), or (C-4) urethane acrylate (Example 12) was used as the crosslinker. The UV curable resin composition and the UV curable sheet were prepared using the above component and evaluated by the same method. In all examples, the excellent adhesiveness and mechanical strength were obtained

TABLE 3

| | | | Example 6 | Example 7 | Example 8 | Example 9 | Example 10 | Example 11 | Example 12 |
|---|---|---|---|---|---|---|---|---|---|
| UV curable composition | (A-1) Solid rubber component | (A-1-1) Styrene-butadiene rubber | 90 | 90 | 90 | 90 | 90 | 90 | 90 |
| | (A-2) Liquid rubber component | (A-2-2) Butadiene homopolymer | 10 | 10 | 10 | 10 | — | — | — |
| | | (A-2-4) Butadiene-styrene random copolymer | — | — | — | — | 10 | 10 | 10 |
| | (B) Photopolymerization initiator | (B-2) 2,2-dimethoxy-1,2-diphenylethan-1-one | 1 | 1 | 1 | 1 | 1 | 1 | 1 |
| | (C) Crosslinker | (C-1) Dipentaerythritol polyacrylate serving (the number of ethylenically unsaturated groups: 6) | 5 | — | — | — | — | — | — |
| | | (C-2) Aromatic polyester acrylate (the number of ethylenically unsaturated groups: 2) | — | 5 | — | — | 5 | — | — |
| | | (C-3) Pentaerythritol tetraacrylate (the number of ethylenically unsaturated groups: 4) | — | — | 5 | — | — | 5 | — |
| | | (C-4) Urethane acrylate (the number of ethylenically unsaturated groups: 10) | — | — | — | 5 | — | — | 5 |
| | (D) Tackifier | (D-1) Aromatic modified terpene resin | 30 | 30 | 30 | 30 | 30 | 30 | 30 |
| Measurement evaluation results | Thickness of adhesive layer (μm) | | 100 | 100 | 100 | 100 | 100 | 100 | 100 |
| | Gel fraction (%) | | 50.3 | 61.5 | 69.8 | 45.8 | 52.1 | 64.6 | 43.8 |
| | 90-degree peel strength (N/inch substrate : PET (50 μm)) | | 10.9 | 10.3 | 7.1 | 8.5 | 12.1 | 9.1 | 9.4 |
| | Mechanical strength | Tensile strength at cutting (MPa) | 3.1 | 4.0 | 4.1 | 2.7 | 3.9 | 4.8 | 3.4 |
| | | Elongation at break (%) | 900 | 740 | 520 | >1000 | 950 | 710 | >1000 |

What is claimed is:

1. A UV curable resin composition, comprising: a rubber component with a diene skeleton, a photopolymerization initiator, a crosslinker, and a tackifier, wherein the rubber component with the diene skeleton contains a solid rubber component and a liquid rubber component at 25° C., the solid rubber component and the liquid rubber component contain substantially no rubber component with functional group introduced thereto, the liquid rubber component contains at least one selected from a butadiene rubber, a styrene-butadiene rubber and an isoprene rubber, the solid rubber component contains at least one selected from a butadiene rubber, a styrene-butadiene rubber and an isoprene rubber, a blending amount of the liquid rubber is 3-40 mass % relative to a total amount of the rubber component, a blending amount of the solid rubber is 60-97 mass % relative to a total amount of the rubber component, and a blending amount of the tackifier is 5-30 mass % relative to a total amount of the rubber component.

2. A UV curable sheet comprising an adhesive layer, which is formed by the UV curable resin composition according to claim 1.

3. The UV curable sheet according to claim 2, wherein a thickness of the adhesive layer is 5-200 μm.

4. A cured product of the UV curable resin composition according to claim 1.

5. A cured product of the UV curable sheet according to claim 2.

6. The cured product according to claim 4, wherein a gel fraction of the cured product is 40% or more.

7. The UV curable sheet according to claim 2, wherein a 90-degree peel strength based on JISK-6854 after irradiation of UV with a cumulative light amount of 1600 mJ/cm$^2$ by a high-pressure mercury lamp at room temperature is 7 N/inch or more.

8. A cured product of the UV curable sheet according to claim 3.

9. The cured product according to claim 5, wherein a gel fraction of the cured product is 40% or more.

10. The UV curable sheet according to claim 3, wherein a 90-degree peel strength based on JISK-6854 after irradiation of UV with a cumulative light amount of 1600 mJ/cm$^2$ by a high-pressure mercury lamp at room temperature is 7 N/inch or more.

* * * * *